(12) United States Patent
Chowdhry

(10) Patent No.: US 9,742,617 B2
(45) Date of Patent: Aug. 22, 2017

(54) VIRTUAL MACHINE MIGRATION IN A CLOUD FABRIC

(75) Inventor: Tripatinder Chowdhry, El Granada, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 579 days.

(21) Appl. No.: 13/701,445

(22) PCT Filed: Jun. 18, 2012

(86) PCT No.: PCT/US2012/042874
§ 371 (c)(1),
(2), (4) Date: Nov. 30, 2012

(87) PCT Pub. No.: WO2013/191673
PCT Pub. Date: Dec. 27, 2013

(65) Prior Publication Data
US 2013/0339527 A1 Dec. 19, 2013

(51) Int. Cl.
*G06F 9/455* (2006.01)
*H04L 29/08* (2006.01)
(Continued)

(52) U.S. Cl.
CPC .... *H04L 29/08144* (2013.01); *G06F 9/45558* (2013.01); *G06F 9/4856* (2013.01);
(Continued)

(58) Field of Classification Search
CPC ......... G06F 2009/4557; G06F 9/45558; G06F 9/5088; G06F 11/0775; G06F 11/3442; G06F 2201/815
See application file for complete search history.

(56) References Cited

U.S. PATENT DOCUMENTS 8,769,531 B2 * 7/2014 Anderson et al. ................ 718/1
2005/0060590 A1 3/2005 Bradley et al.
(Continued)

OTHER PUBLICATIONS

A rock-solid cloud platform for blue-sky thinking, retrieved from http://www.windowsazure.com/en-us/, dowlnloaded on Feb. 26, 2013, 2 pages.
(Continued)

*Primary Examiner* — Barbara Anyan
(74) *Attorney, Agent, or Firm* — Moritt Hock & Hamroff LLP; Steven S. Rubin, Esq.

(57) ABSTRACT

Technologies are generally described for systems and methods configured to migrate a virtual machine. Some systems may include a memory configured to store terms of a service level agreement for a first virtual machine. The first computing device may determine the terms of the service level agreement for the first virtual machine. The first computing device may be configured to determine that the first virtual machine is operating on the first computing device using operating resources in violation of the terms of the service level agreement. The first computing device may be configured to identify a second virtual machine operating on the first computing device. The first computing device may be configured to migrate one of the first virtual machine or the second virtual machine to a second computing device in response to the determination of the violation.

18 Claims, 6 Drawing Sheets

(51) Int. Cl.
*G06F 9/48* (2006.01)
*G06F 9/50* (2006.01)
(52) U.S. Cl.
CPC ............. H04L 67/10 (2013.01); *G06F 9/50* (2013.01); *G06F 9/5072* (2013.01); *G06F 9/5077* (2013.01); *G06F 2009/4557* (2013.01)

(56) References Cited

U.S. PATENT DOCUMENTS

| | | | |
|---|---|---|---|
| 2007/0204266 A1* | 8/2007 | Beaty | G06F 9/45558 718/1 |
| 2008/0263258 A1 | 10/2008 | Allwell et al. | |
| 2008/0281946 A1 | 11/2008 | Swildens et al. | |
| 2008/0295096 A1 | 11/2008 | Beaty et al. | |
| 2009/0228589 A1* | 9/2009 | Korupolu | 709/226 |
| 2009/0276771 A1* | 11/2009 | Nickolov | G06F 9/4856 717/177 |
| 2010/0125844 A1* | 5/2010 | Mousseau | G06F 9/50 718/1 |
| 2010/0169253 A1 | 7/2010 | Tan | |
| 2011/0126207 A1* | 5/2011 | Wipfel et al. | 718/104 |
| 2011/0185064 A1* | 7/2011 | Head | G06F 9/5077 709/226 |
| 2011/0264939 A1* | 10/2011 | Wong et al. | 713/323 |
| 2011/0277027 A1* | 11/2011 | Hayton | H04L 63/0884 726/8 |
| 2011/0302578 A1* | 12/2011 | Isci et al. | 718/1 |
| 2012/0096460 A1* | 4/2012 | Sekiguchi et al. | 718/1 |
| 2012/0131573 A1 | 5/2012 | Dasari et al. | |
| 2013/0031158 A1* | 1/2013 | Salsburg | G06F 9/5072 709/203 |
| 2013/0091282 A1* | 4/2013 | Tontiruttananon | G06F 9/5061 709/226 |
| 2013/0111033 A1* | 5/2013 | Mao | G06F 9/5072 709/226 |
| 2013/0131988 A1* | 5/2013 | Vermeer et al. | 702/5 |
| 2013/0263120 A1* | 10/2013 | Patil et al. | 718/1 |
| 2013/0275568 A1* | 10/2013 | Nguyen et al. | 709/223 |
| 2013/0311989 A1* | 11/2013 | Ota | G06F 9/45558 718/1 |

OTHER PUBLICATIONS

Open Cloud Computing, Cloud Hosting, Cloud Storage by Rackspace, retrieved from http://www.rackspace.com/cloud/, downloaded on Feb. 26, 2013, 3 pages.
Amazon Elastic Compute Cloud (Amazon EC2), Amazon Web Services, retrieved from http://aws.amazon.com/ec2/, downloaded on Feb. 26, 2013, 16 pages.
Feng, X. & Mok, A. K., A Model of Hierarchical Real-Time Virtual Resources, IEEE Compute Society, 2002, 10 pages.
Nelson, M., Lim, B., & Hutchins, G., Fast Transparent Migration for Virtual Machines, USENIX, 2005, retrieved from http://static.usenix.org/publications/library/proceedings/usenix05/tech/general/full_papers/short_papers/nelson/nelson.pdf, 7 pages.
Kim, K. H. et al., Power-aware Provisioning of Cloud Resources for Real-time Services, MGC '09 Proceedings of the 7th International Workshop on Middleware for Grids, Clouds and e-Science, 2009, 6 pages.
Mishra, A. K. et al., Towards Characterizing Cloud Backend Workloads: Insights from Google Compute Clusters, ACM Sigmetrics Performance Evaluation Review, Mar. 2010, pp. 34-41, vol. 37.
Iyer, R., et al., Virtual Platform Architectures for Resource Metering in Datacenters, Sigmetrics, Jun. 2009, 89-90.
International Search Report for PCT Application with application No. PCT/US12/42874, dated Sep. 5, 2012.

* cited by examiner

VIRTUAL MACHINE MIGRATION IN A CLOUD FABRIC

CROSS REFERENCE TO RELATED APPLICATION

This application is a U.S. National Stage filing under 35 U.S.C. §371 of International Application No. PCT/US12/42874 filed Jun. 18, 2012. The disclosure of the International Application is hereby incorporated by reference in its entirety.

BACKGROUND

Unless otherwise indicated herein, the materials described in this section are not prior art to the claims in this application and are not admitted to be prior art by inclusion in this section.

A cloud fabric may include two or more computing devices. Virtual machines may operate on the computing devices. Two or more virtual machines may operate on a single computing device.

SUMMARY

In an example, methods for migrating a virtual machine from a first computing device to a second computing device are generally described. The methods may include by at least one computing device, determining terms of a service level agreement for a first virtual machine. The methods may include determining that the first virtual machine is operating on the first computing device using operating resources in violation of the terms of the service level agreement. The methods may include identifying a second virtual machine operating on the first computing device. The methods may include migrating one of the first virtual machine or the second virtual machine to the second computing device in response to the determination of the violation.

In an example, systems configured to migrate a virtual machine are generally described. The systems may include a memory, a first computing device and/or a second computing device. The memory may be configured to store terms of a service level agreement for a first virtual machine. The first computing device may be configured to be in communication with the memory. The second computing device may be configured to be in communication with the first computing device. The first computing device may be configured to determine the terms of the service level agreement for the first virtual machine. The first computing device may be configured to determine that the first virtual machine is operating on the first computing device using operating resources in violation of the terms of the service level agreement. The first computing device may be configured to identify a second virtual machine operating on the first computing device. The first computing device may be further configured to migrate one of the first virtual machine or the second virtual machine to the second computing device in response to the determination of the violation.

In an example, systems configured to migrate a virtual machine are generally described. The systems may include a first memory, a second memory, a first computing environment, a second computing environment, a region system server, and/or a global system server. The first memory may be configured to store terms of a service level agreement for a first virtual machine. The second memory may be configured to store the terms of the service level agreement for a second virtual machine. The first computing environment may be configured to be in communication with the first memory. The second computing environment may be configured to be in communication with the first computing environment and the second memory. The region system server may be configured to be in communication with the first and the second computing environment. The global system server may be configured to be in communication with the region system server. The first computing environment may be configured to determine the terms of the service level agreement for the first virtual machine. The first computing environment may be configured to determine that the first virtual machine is operating on the first computing environment using operating resources in violation of the terms of the service level agreement. The first computing environment may be configured to identify a second virtual machine operating on the first computing environment. The first computing environment may be configured to migrate one of the first virtual machine or the second virtual machine to the second computing environment in response to the determination of the violation. The first computing environment may be configured to update a local table to indicate the migration. The local table may be configured to be in communication with the first computing environment. The region system server may be configured to update a region table to indicate the migration. The region table may be configured to be in communication with the region system server. The global system server may be configured to update a global table to indicate the migration. The global table may be configured to be in communication with the global system server.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
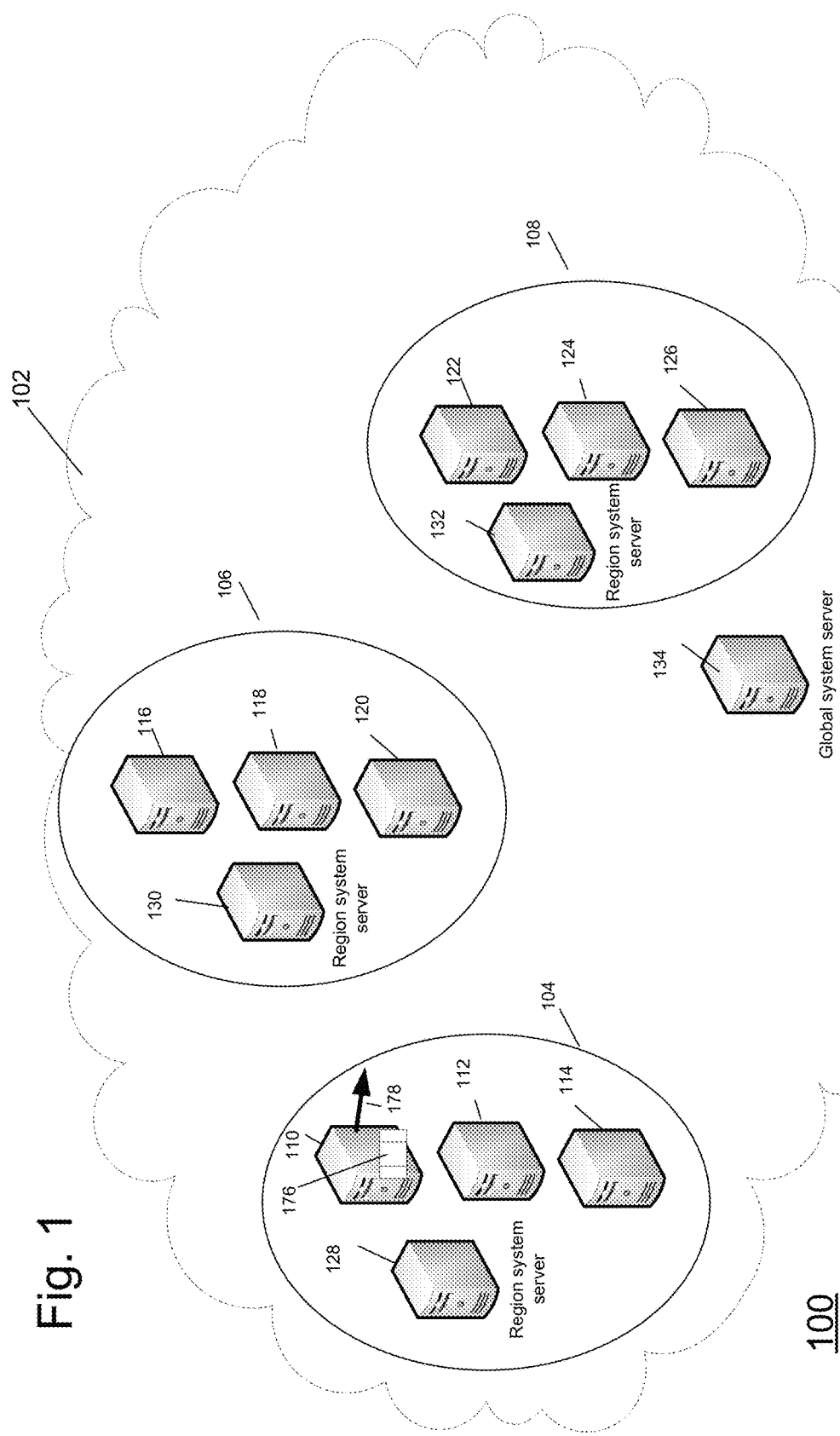
FIG. 1 illustrates some example systems that can be utilized to implement virtual machine migration in a cloud fabric.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to virtual machine migration in a cloud fabric.

Briefly stated, technologies are generally described for systems and methods configured to migrate a virtual machine. Some systems may include a memory configured to store terms of a service level agreement for a first virtual machine. The first computing device may determine the terms of the service level agreement for the first virtual machine. The first computing device may be configured to determine that the first virtual machine is operating on the first computing device using operating resources in violation of the terms of the service level agreement. The first computing device may be configured to identify a second virtual machine operating on the first computing device. The first computing device may be configured to migrate one of the first virtual machine or the second virtual machine to a second computing device in response to the determination of the violation.

FIG. 1 illustrates some example systems that can be utilized to implement virtual machine migration in a cloud fabric arranged according to at least some embodiments described herein. In some examples, as explained in more detail below, a system 100 may include a global system server 134, a first region of computing devices 104, a second region of computing devices 106 and/or a third region of computing devices 108 configured to be in communication over a cloud fabric 102. First region of computing devices 104 may include a region system server 128 and/or computing devices 110, 112 and/or 114. Second region of computing devices 106 may include a region system server 130 and/or computing devices 116, 118 and/or 120. Third region of computing devices 108 may include a region system server 132 and/or computing devices 122, 124 and/or 126. A computing environment may include one or more computing devices using one or more operating systems. As discussed in more detail below, some of the computing devices may include two or more virtual machines operating in a multi-tenant virtual machine architecture. In an example, a noisy virtual machine 176 may operate on computing device 110. Noisy virtual machine 176 may operate with operating resources in violation of terms of a service level agreement for region 104. Computing device 110 may be configured to migrate, as shown by arrow, 178 either noisy virtual machine 176 or another virtual machine in computing device 110. The migration may be based on resources requested by virtual machine 176, terms of a service level agreement of region 104 and/or a fee paid for virtual machine 176 to system 100.

Figure 2:
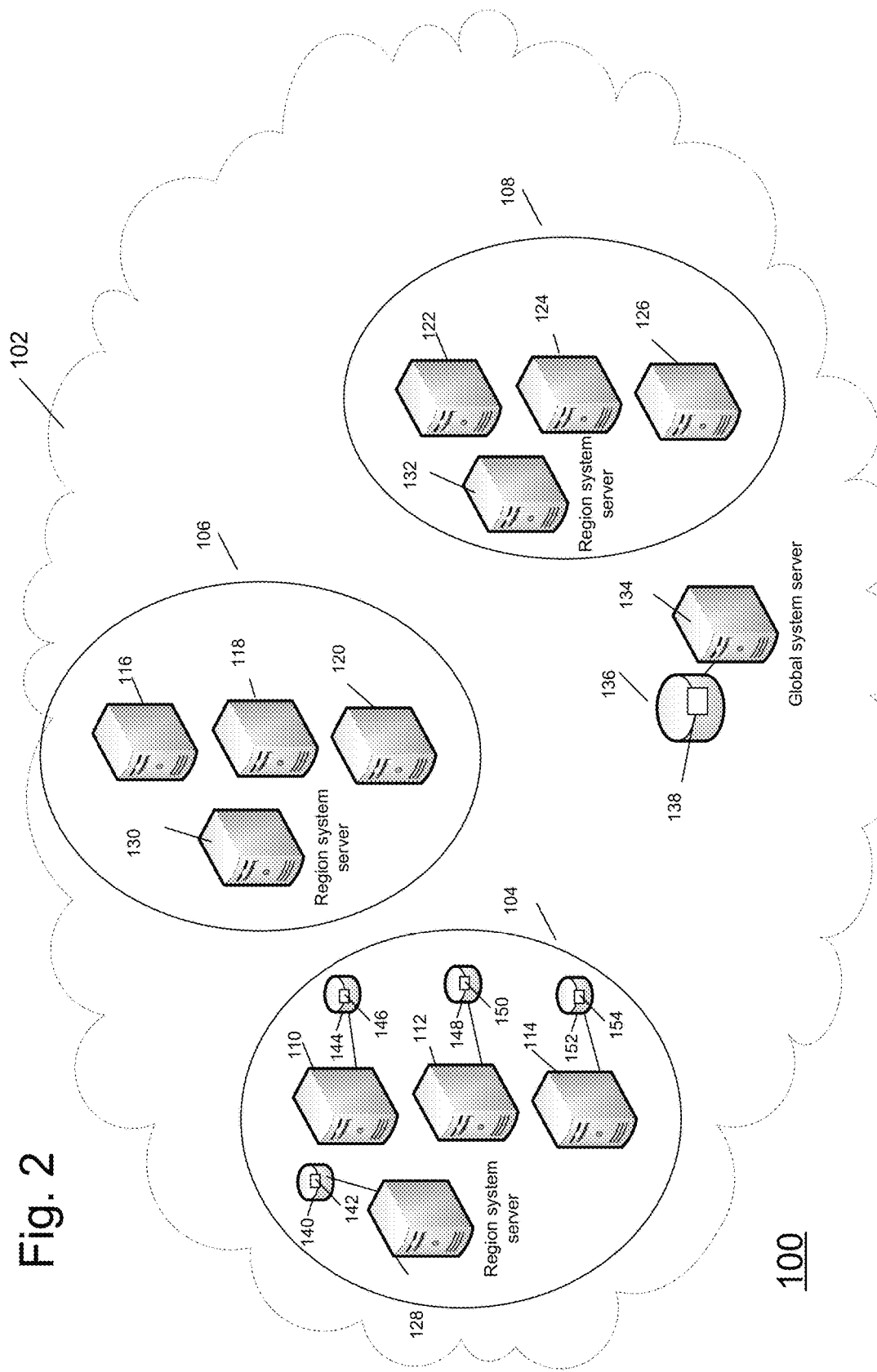
FIG. 2 illustrates some example systems that can be utilized to implement virtual machine migration in a cloud fabric.

FIG. 2 is illustrates some example systems that can be utilized to implement virtual machine migration in a cloud fabric arranged according to at least some embodiments described herein. Those components in FIG. 2 that are labeled identically to components of FIG. 1 will not be described again for the purposes of clarity.

The discussion below will focus on region of computing devices 104 as being illustrative of region of computing devices 106 and region of computing devices 108. Region system server 128 may be configured to be in communication with a memory 140 including instructions 142. Computing device 110 may be configured to be in communication with a memory 144 including instructions 146. Computing device 112 may be configured to be in communication with a memory 148 including instructions 150. Computing device 114 may be configured to be in communication with a memory 152 including instructions 154. Global system server 134 may be configured to be in communication with a memory 136 including instructions 138. As described in detail below, instructions 138, 142, 146, 150 and/or 154 may be configured to migrate one or more virtual machines in response to a detection of a noisy virtual machine.

Regions 104, 106, 108 may provide different service class levels of resources as may be defined by terms of service level agreements for each region. For example, one region may have faster processors, newer computers, fiber channel communications, stricter policies and regulations regarding access for the resources in the service level agreement, and/or a higher cost. Another region may have slower resources but less regulations and a lower cost in the service level agreement. In an example, a first service class level may have 8 core, 2.5 GHZ processors, with fiber optic links, and 12 GB RAM. A second service class level may have 4 core, 1.8 GHZ processors, copper links, and 4 GB of RAM.

Figure 3:
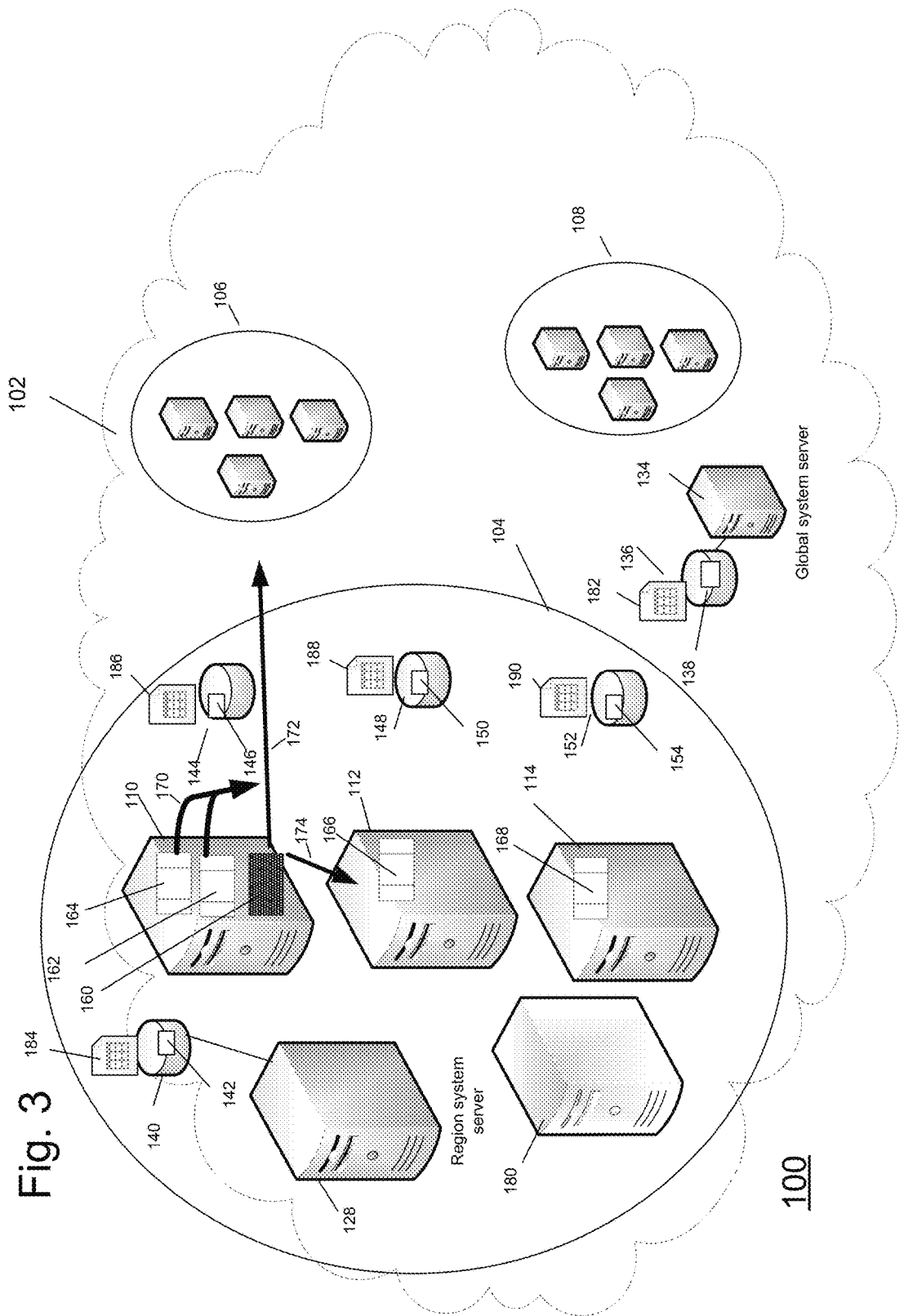
FIG. 3 illustrates some example systems that can be utilized to implement virtual machine migration in a cloud fabric.

FIG. 3 illustrates some example systems that can be utilized to implement virtual machine migration in a cloud fabric arranged according to at least some embodiments described herein. Those components in FIG. 3 that are labeled identically to components of FIGS. 1 and 2 will not be described again for the purposes of clarity.

Global system server 134 may perform an inventory of resource information in cloud fabric 102 to identify servers, processors, computing devices, storage, network bandwidth, etc. Global system server 134 may store the resource information in memory 136. Global system server 134 may then define which computing devices are disposed in respective regions 104, 106, 108. For example, global system server 134 may analyze memory 136 for business rules, workload policies, physical locations or other service level attributes to determine which computing devices should be disposed in respective regions 104, 106, 108. Regions may have different service class levels as is discussed in more detail below.

Global system server 134 may store in memory 136 a global system table 182 including information relating to cloud fabric 102. For example, global system table 182 may be configured to store indications of regions 104, 106, 108, a status of the regions in terms of which region has an available computing device, and an indication of virtual machines that are noisy. Similarly, region system server 128 may be configured to store in memory 140 a region system table 184 that indicates information regarding region 104. Region system server 128 may be configured to store in region system table 184, indications of computing devices 110, 112, 114. Region system server 128 may also be configured to store in region system table 184, a status of the computing devices in terms of which computing device has an availability and an indication of virtual machines that are noisy. Computing devices 110, 112, 114 may be configured to store local system tables 186, 188, 190. Local system tables 186, 188, 190 may indicate information regarding each respective computing device 110, 112, 114. For example, local system table 186 may store information relating to a status of computing device 110. For example, local system table 186 may store information such as whether computing device 110 has resources available to handle additional virtual machines or whether a virtual machine operating on computing device 110 is noisy.

Computing devices 110, 112, 114 may be provisioned as a single entity when virtual machines are assigned. For example, a computing device may be located in one physical housing. Similarly, processors in two distinct physical housings may be provisioned as a single computing device. One or more processors in a single housing may be provisioned as two or more computing devices.

Global system server 134 may review the inventory resource information of cloud fabric 102 in memory 136 and spawn respective region instructions and region system tables for regions 104, 106, 108 (region system instructions 142 and region system table 184 are shown for region 104). Region system servers may then spawn respective local instructions for computing devices. The local instructions may create and populate local system tables (local system instructions 146, 150, 154 and local system tables 186, 188, 190 are shown for computing devices 110, 112, 114). Local instructions may be used to monitor virtual machine activity in respective computing devices. For example, local instructions may monitor whether a virtual machine is requesting more operating resources than that allowed by terms of service level agreements and update local system tables 186, 188, 190 accordingly.

As virtual machines operate on computing devices, local system tables may be updated. Region system server 128 may receive messages from respective local system processes and update region system tables accordingly. Region system server 128 thus may have a view of activity in a region. Similarly, global system server 134 may receive messages from region system servers and update global system table 182 accordingly. Global system server 134 thus may have a view of activity in cloud fabric 102.

Local system instructions and tables may maintain and monitor activity at a computing device level. Region system instructions and tables may maintain and monitor activity for a group of computing devices in a region. Global system instructions and the global system server table may maintain and monitor activity for the cloud fabric.

In an example, computing device 110 may identify that virtual machines 160, 162, and/or 164 are operating on computing device 110. Virtual machine 166 may operate on computing device 112. Virtual machine 168 may operate on computing device 114. Over time, one of the virtual machines may become noisy. For example, virtual machine 160 may use operating resources that are more than that allowed in the terms of the software licensing agreement for region 104. Virtual machine 160 is highlighted by dark shading to indicate that virtual machine 160 is noisy. Resources may include computational power, disk access, memory, network access, processing unit access, input/output access, etc.

Computing device 110 may determine that virtual machine 160 is in violation of the terms of the service licensing agreement for region 104. For example, computing device 110 may use a hypervisor or piece of software to compare operating resources being used by virtual machine 160 and terms of a service level agreement for region 104. The terms of the service level agreement may be stored in memory 144 or memory 140. Computing devices 110, 112, 114 in region 104 may operate under the same or similar licensing agreement with the same or similar service class level. Computing device 110 may produce an indication of the violation by virtual machine 160 and store the indication on the violation in local system table 186.

Instructions 146 may then control computing device 110 to migrate one or more virtual machines 160, 162, 164 in response to the determination of the violation by virtual machine 160. The migration may be based on the terms of the service level agreement in region 104. The migration may also be based on payment for virtual machine 160 and available computing resources in cloud fabric 102.

In one example, instructions 146 may control computing device 110 to analyze a load of other computing devices in region 104 to determine whether other computing devices can handle the operating resources of virtual machine 160. In an example, virtual machine 160 may be operating such that processing units or clock cycles beyond that allowed by the terms of the service level agreement are being used. Computing device 110 may determine whether computing device 112 or computing device 114 can handle virtual machine 160 using the additional processing units or clock cycles. Computing device 110 may analyze region system table 184, which may including communicating with region system server 128, to determine the load of computing device 112 and computing device 114. In examples, where computing device 112 can handle virtual machine 160, computing device 110, in conjunction with region system server 128, may control migration of virtual machine 160 from computing device 110 to computing device 112. The migration is illustrated by arrow 174. In one example, region system server 128 may be controlled to provision an additional computing device 180 in region 104 to handle virtual machine 160. Region system server 128 and computing device 110 may be configured to migrate virtual machine 1160 to additional computing device 180.

In one example, computing device 110 may analyze memory 144 and determine that extra fees have been paid for virtual machine 160 to system 110. Because of the extra fees paid, virtual machine 160 may be allowed to operate in violation of the terms of the service level agreement. In this example, instructions 146 may control computing device 110 to coordinate with region system server 128 and migrate virtual machine 162 and/or or virtual machine 164 to another computing device in region 104. This migration is illustrated by arrow 170. Region system server 128 may analyze region system table 184 to determine the load of computing device 112 and computing device 114. Region system server 128 may determine whether computing device 112 or computing device 114 can handle virtual machine 162 or virtual machine 164.

In one example, instructions 146 may control computing device 110 to analyze the terms of the service level agreement relating to region 104 and, in conjunction with region system server 128, determine that virtual machine 160 should be migrated to another region. For example, region system server 128 may analyze memory 140 and determine that computing device 112 and computing device 114 may not be able to handle the operating resources requested by virtual machine 160. Instructions 146 may control computing device 110 to coordinate with region system server 128 and global system server 134 to migrate virtual machine 160 to another region 106 where region 106 may have a service level agreement with a different service class level. This migration is illustrated by arrow 172. For example, a service class level in region 106 may be a higher class requiring greater payment of fees and providing virtual machine 160 the additional operating resources. Computing device 110 may ask the user of virtual machine 160 to pay more for use of region 106 with a higher service class level. A service class level in region 106 may have a lower class requiring the same or less payment of fees. In this example, the requested operating resources of virtual machine 160 may not produce a violation of the terms of the service level agreement.

Among other possible benefits, a system in accordance with the disclosure can manage noisy virtual machines sharing a computing device with other virtual machines while respecting terms of a service level agreement. Noisy virtual machines may be migrated to other available resources in a cloud fabric. Load hand offs may be easily achieved in a cloud fabric based system. Noisy virtual machines may be promoted or demoted. With different service class levels, a configurable, flexible pricing model based on regions of computing devices may be achieved. A system may avoid allowing a virtual machine in a multi-tenant architecture to hog network resources.

Figure 4:
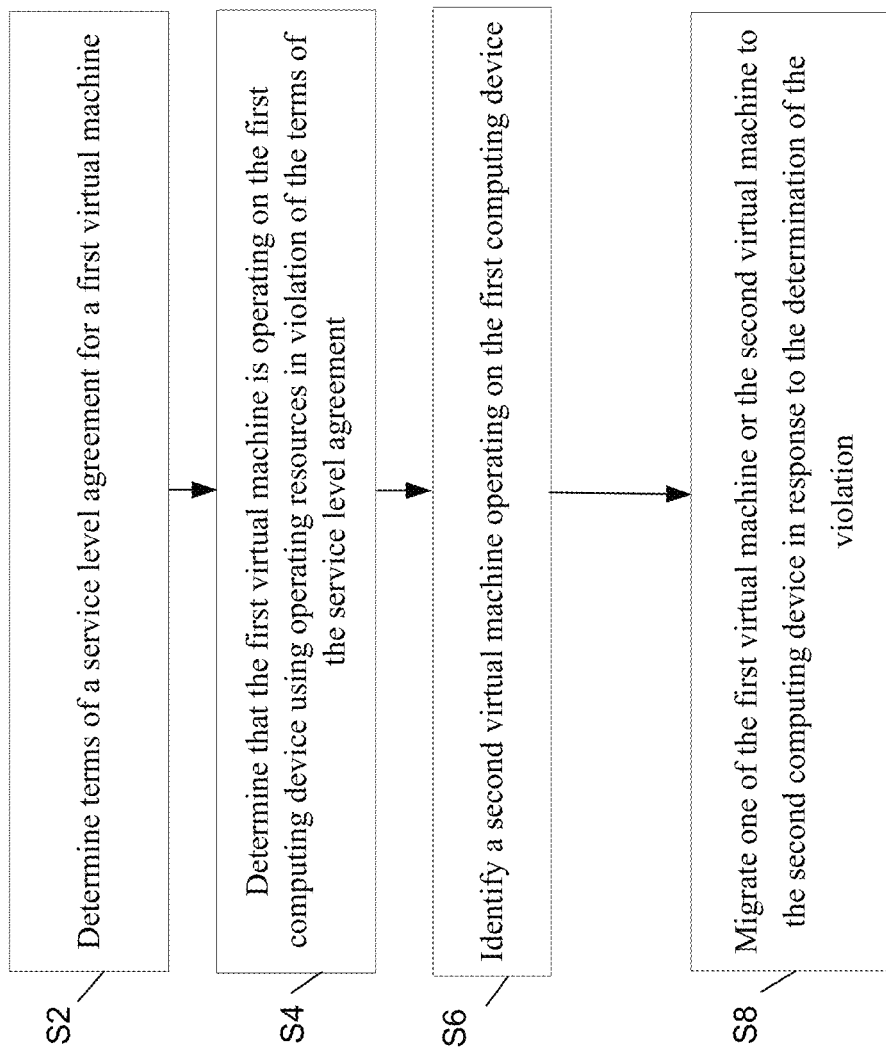
FIG. 4 depicts a flow diagram of example processes for implementing virtual machine migration in a cloud fabric.

FIG. 4 depicts a flow diagram of example processes for implementing virtual machine migration in a cloud fabric arranged in accordance with at least some embodiments described herein. The process in FIG. 4 could be implemented using, for example, system 100 discussed above to migrate a virtual machine from a first computing device to a second computing device. An example process may include one or more operations, actions, or functions as illustrated by one or more of blocks S2, S4, S6, and/or S8. Although illustrated as discrete blocks, various blocks may be divided into additional blocks, combined into fewer blocks, or eliminated, depending on the desired implementation.

Processing may begin at block S2, "Determine terms of a service level agreement for a first virtual machine." At block S2, a computing device may be configured to determine terms of a service level agreement for a first virtual machine.

Processing may continue from block S2 to block S4, "Determine that the first virtual machine is operating on the first computing device using operating resources in violation of the terms of the service level agreement." At block S4, the computing device may determine that the first virtual machine is operating on the first computing device. The computing device may further determine that the first virtual machine is operating in violation of the terms of the service level agreement. For example, the virtual machine may be using extra computing power or memory or other resources in violation of the service level agreement.

Processing may continue from block S4 to block S6, "Identify a second virtual machine operating on the first computing device." At block S6, the computing device may identify a second virtual machine operating on the first computing device.

Processing may continue from block S6 to block S8, "Migrate one of the first virtual machine or the second virtual machine to the second computing device in response to the determination of the violation." At block S8, the computing device may migrate one of the first virtual machine or the second virtual machine to the second computing device in response to the determination of the violation. The first and second computing devices may have the same or different service level agreements and either the same or different service class levels. A local table configured to be in communication with the first computing device may be updated to indicate the migration. A region system server may be configured to be in communication with the first and second computing devices. The region system server may be configured to update a region table to indicate the migration. Depending on the service level agreements, the computing device may migrate the first or the second virtual machine. For example, fees paid for the first virtual machine may affect whether the first virtual machine is migrated. The first or second virtual machine may be migrated to another computing device with the same service class level depending on a load on the other computing device.

Figure 5:
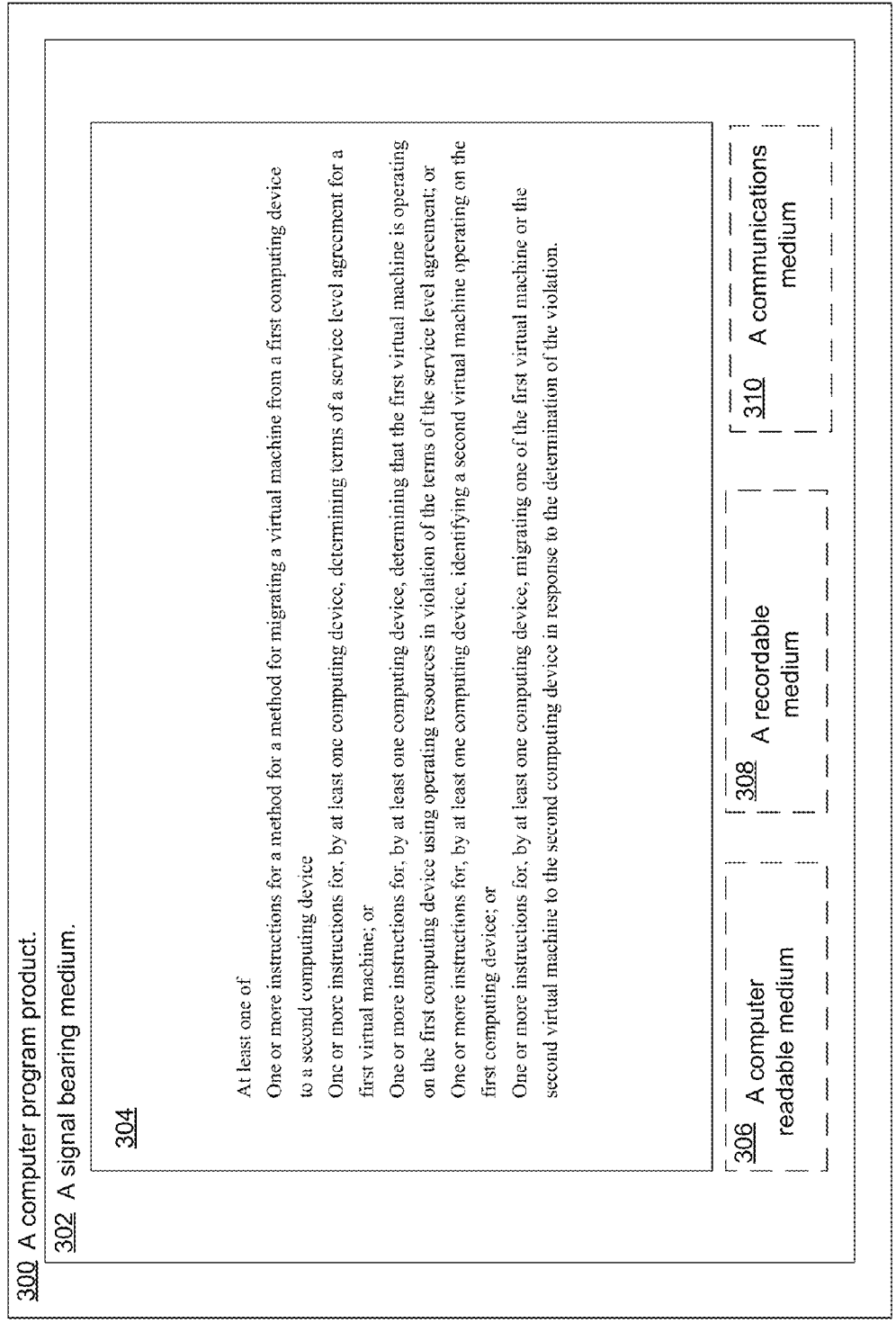
FIG. 5 illustrates computer program products for implementing virtual machine migration in a cloud fabric.

FIG. 5 illustrates computer program products 300 for implementing virtual machine migration in a cloud fabric arranged in accordance with at least some embodiments described herein. Computer program product 300 may include a signal bearing medium 302. Signal bearing medium 302 may include one or more instructions 304 that, when executed by, for example, a processor, may provide the functionality described above with respect to FIGS. 1-4. Thus, for example, referring to system 100, one or more of processors 122 or 124 may undertake one or more of the blocks shown in FIG. 5 in response to instructions 304 conveyed to the system 100 by the signal bearing medium 302.

In some implementations, signal bearing medium 302 may encompass a computer-readable medium 306, such as, but not limited to, a hard disk drive (HDD), a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communication link, a wireless communication link, etc.). Thus, for example, computer program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

Figure 6:
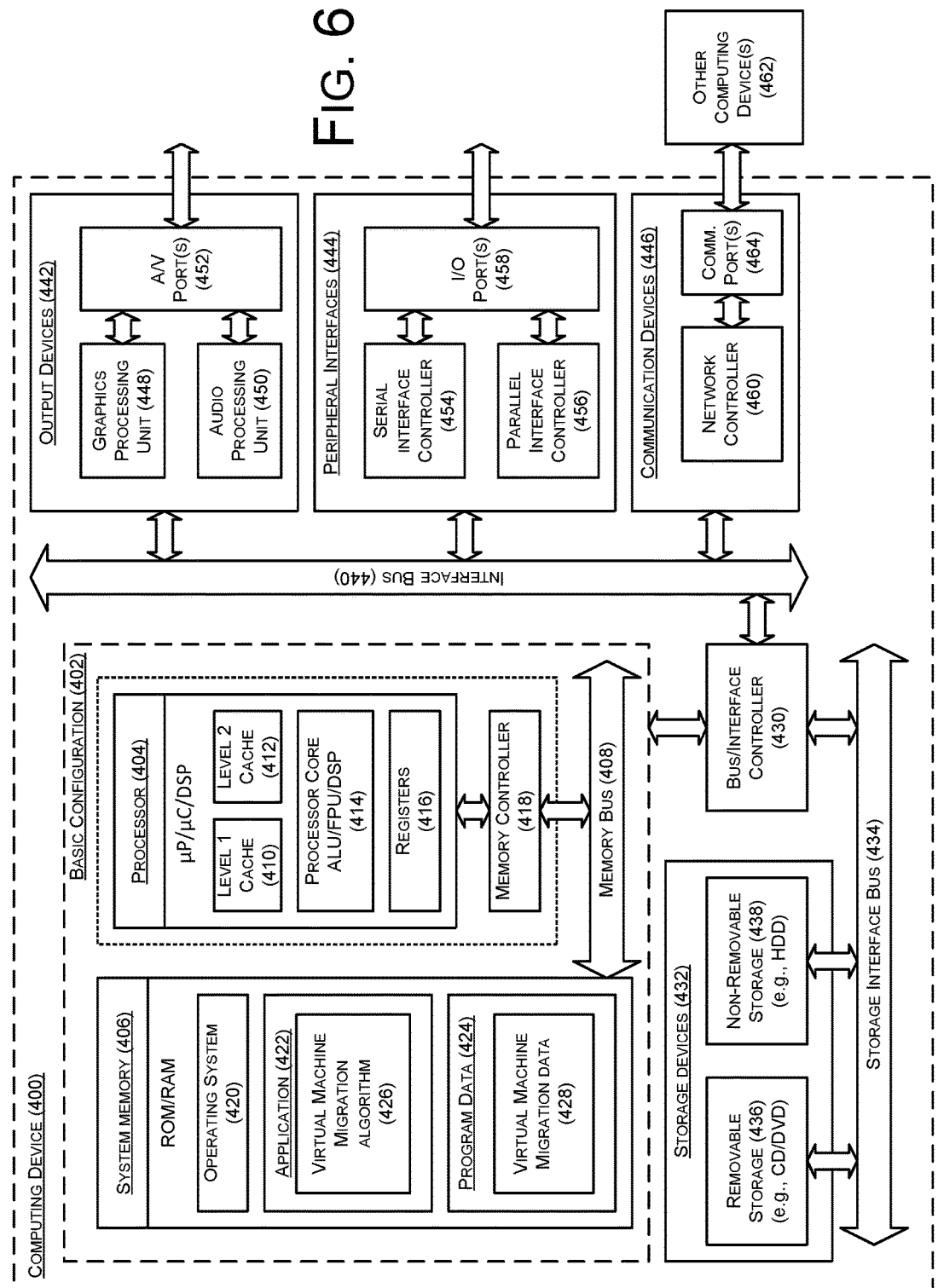
FIG. 6 is a block diagram illustrating an example computing device that is arranged to implement virtual machine migration in a cloud fabric, all arranged according to at least some embodiments described herein.

FIG. 6 is a block diagram illustrating an example computing device 400 that is arranged to implement virtual machine migration in a cloud fabric arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one or more levels of caching, such as a level one cache 410 and a level two cache 412, a processor core 414, and registers 416. An example processor core 414 may include an arithmetic logic unit (ALU), a floating point unit (FPU), a digital signal processing core (DSP core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof.

System memory 406 may include an operating system 420, one or more applications 422, and program data 424.

Application 422 may include a virtual machine migration algorithm 426 that is arranged to perform the functions as described herein including those described previously with respect to FIGS. 1-5. Program data 424 may include virtual machine migration data 428 that may be useful for implementing virtual machine migration in a cloud fabric as is described herein. In some embodiments, application 422 may be arranged to operate with program data 424 on operating system 420 such that virtual machine migration in a cloud fabric may be provided. This described basic configuration 402 is illustrated in FIG. 6 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to migrate a virtual machine from a first computing device to a second computing device, the method comprising, by at least one of the first computing device and the second computing device:
   determining, by the at least one of the first computing device and the second computing device, terms of a first service level agreement for a first virtual machine, wherein the terms of the first service level agreement are stored in a memory effective to be in communication with the at least one of the first computing device and the second computing device, wherein:
   the terms of the first service level agreement define a first service class level,
   a first region is characterized by the first service class level,
   the first region includes a first set of computing devices, the first set of computing devices includes at least the first computing device, and
   the first region is among two or more regions characterized by respective terms of different service class levels;
   determining, by the at least one of the first computing device and the second computing device, that the first virtual machine is currently operating on the first computing device using operating resources in violation of the terms of the first service level agreement;
   identifying, by the at least one of the first computing device and the second computing device, a second virtual machine operating on the first computing device; and
   selecting, by the at least one of the first computing device and the second computing device, one of the first virtual machine or the second virtual machine to migrate subsequent to the determination of the violation, wherein the selection is based on the terms of the first service level agreement;
   selecting, by the at least one of the first computing device and the second computing device, the second computing device for the selected one of the first virtual machine or the second virtual machine to migrate to, wherein:
   the second computing device is selected from among the first set of computing devices of the first region and a second set of computing devices of a second region,
   the selection of the second computing device is based on the terms of the first service level agreement,
   the second computing device has a second service level agreement,
   the second region is characterized by a second service class level different from the first service class level, and
   the second region is among the two or more regions; and
   in response to the selection of the second computing device, migrating the selected one of the first virtual machine or the second virtual machine from the first computing device to the second computing device.

2. The method of claim 1, wherein the second service level agreement includes terms of the first service class level.

3. The method of claim 1, further comprising updating a local table configured to be in communication with the first computing device to indicate the migration.

4. The method of claim 1, wherein selecting the one of the first virtual machine or the second virtual machine comprises selecting the first virtual machine to migrate to the second computing device, and wherein the first region is different from the second region.

5. The method of claim 1, wherein:
   a region system server is configured to be in communication with the first computing device and the second computing device,
   a global system server is configured to be in communication with the first computing device and the second computing device,
   the second service level agreement includes terms of the first service class level, and the method further comprises:
  updating a local table stored on the first computing device to indicate the migration, wherein the local table includes information related to available resources of the first computing device and information related to the first virtual machine and other virtual machines currently operating on the first computing device using operating resources in violation of the terms of the first service level agreement;
  updating a region table stored on the region system server to indicate the migration, wherein the region table includes information related to availability of computing devices of the first region and the two or more regions; and
  updating a global table stored on the global system server to indicate the migration, wherein the global table includes first indications of the first region and the two or more regions, and second indications of whether the first region and/or the two or more regions are available to operate the first virtual machine or the second virtual machine.

6. The method of claim 1, wherein selecting the one of the first virtual machine or the second virtual machine comprises selecting the first virtual machine or the second virtual machine to migrate based on a fee paid for the first virtual machine.

7. The method of claim 1, wherein:
selecting the one of the first virtual machine or the second virtual machine comprises selecting the first virtual machine to migrate to the second computing device, and
the method further comprises requesting additional fees to operate the first virtual machine.

8. The method of claim 1, wherein:
the second service level agreement includes terms of the first service class level, and
selecting the one of the first virtual machine or the second virtual machine to migrate comprises:
  analyzing a third computing device to determine a load of the third computing device, wherein the third computing service has a third service level agreement with the terms of the first service class level; and
  selecting the one of the first virtual machine or the second virtual machine to migrate based on the load of the third computing device.

9. The method of claim 1, wherein:
the second service level agreement includes terms of the first service class level, and
selecting the one of the first virtual machine or the second virtual machine to migrate comprises:
  analyzing a third computing device to determine a load of the third computing device, wherein the third computing service has a third service level agreement with the first service class level, wherein the analyzing is performed by communicating with a region system server configured to be in communication with the first computing device, the second computing device, and the third computing device; and
  selecting the one of the first virtual machine or the second virtual machine to migrate based on the load of the third computing device.

10. The method of claim 1, wherein:
the second service level agreement includes terms of the first service class level, and
selecting the one of the first virtual machine or the second virtual machine to migrate comprises:
  analyzing a third computing device to determine a load of the third computing device, wherein the third computing service has a third service level agreement with the terms of the first service class level; and
  selecting the first virtual machine to migrate to the third computing device after determination that the load is able to handle the operating resources of the first virtual machine.

11. The method of claim 1, wherein:
the second service level agreement includes terms of the first service class level, and
selecting the one of the first virtual machine or the second virtual machine to migrate comprises:
  analyzing a third computing device to determine a load of the third computing device, wherein the third computing service has a third service level agreement with the terms of the first service class level; and
  selecting the first virtual machine to migrate to the second computing device after a determination that the load is unable to handle the operating resources of the first virtual machine.

12. A system configured to migrate a virtual machine, the system comprising:
  a memory configured to store terms of a first service level agreement for a first virtual machine, wherein:
    the terms of the first service level agreement define a first service class level,
    a first region is characterized by the first service class level,
    the first region includes a first set of computing devices, and
    the first region is among two or more regions characterized by respective terms of different service class levels;
  a first computing device configured to be in communication with the memory, wherein the first computing device is among the first set of computing devices; and
  a second computing device configured to be in communication with the first computing device,
  wherein the first computing device is configured to:
    determine the terms of the first service level agreement for the first virtual machine;
    determine that the first virtual machine currently operates on the first computing device using operating resources in violation of the terms of the first service level agreement;
    identify a second virtual machine that operates on the first computing device;
    select one of the first virtual machine or the second virtual machine to migrate subsequent to the determination of the violation, wherein the selection is based on the terms of the first service level agreement;
    select the second computing device for the selected one of the first virtual machine or the second virtual machine to migrate to, wherein:
      the second computing device is selected from among the first set of computing devices of the first region and a second set of computing devices of a second region,
      the selection of the second computing device is based on the terms of the first service level agreement, the second computing device has a second service level agreement, the second region is characterized by a second service class level different from the first service class level, and the second region is among the two or more regions; and in response to the selection of the second computing device, migrate the selected one of the first virtual machine or the second virtual machine to the second computing device.

13. The system of claim 12, further comprising:

a third computing device;

a region system server configured to be in communication with the first computing device and the second computing device; and a global system server configured to be in communication with the first computing device, the second computing device, and the third computing device, wherein:

the third computing device is associated with the second region, the third computing device has a third service level agreement with terms of the second service class level, the first computing device is further configured to update a local table to indicate the migration, the local table is configured to be in communication with the first computing device and includes information related to available resources of the first computing device and information related to the first virtual machine and other virtual machines that currently operate on the first computing device using operating resources in violation of the terms of the first service level agreement, the region system server is configured to update a region table to indicate the migration, the region table is configured to be in communication with the region system server and includes information related to availability of computing devices of the first region and the two or more regions, the global system server is configured to update a global table to indicate the migration, and the global table is configured to be in communication with the global system server, and includes first indications of the first region and the two or more regions, and second indications of whether the first region and/or the two or more regions are available to operate the first virtual machine or the second virtual machine.

14. The system of claim 12, wherein:

the second service level agreement includes terms of the first service class level, the system further comprises a region system server configured to be in communication with the first computing device, the second computing device, and a third computing device, the region system server is configured to determine a load of the third computing device, the third computing service has a third service level agreement with the terms of the first service class level, and the first computing device is configured to select the first virtual machine to migrate to the second computing device after a determination that the load is unable to handle the operating resources of the first virtual machine.

15. A system configured to migrate a virtual machine, the system comprising:

a first memory configured to store terms of a first service level agreement for a first virtual machine;

a second memory configured to store terms of a second service level agreement for a second virtual machine;

a first region of computing devices that are configured to be in communication with the first memory, wherein the first region of computing devices is characterized by a first service class level, and wherein the first region of computing devices is among two or more regions of computing devices characterized by respective terms of different service class levels;

a second region of computing devices that are configured to be in communication with the computing devices of the first region and with the second memory, wherein the second region of computing devices is characterized by a second service class level different from the first service class level, and wherein the second region of computing devices is among the two or more regions of computing devices;

a region system server configured to be in communication with the first region; and a global system server configured to be in communication with the region system server, wherein the computing devices of the first region are configured to:

determine the terms of the first service level agreement for the first region of computing devices;

determine that the first virtual machine currently operates on the computing devices of the first region using operating resources in violation of the terms of the first service level agreement for the first virtual machine;

identify a second virtual machine that operates on the computing devices of the first region;

select one of the first virtual machine or the second virtual machine to migrate subsequent to the determination of the violation, wherein the selection is based on the terms of the first service level agreement for the first region of computing devices;

select the computing devices of the second region for the selected one of the first virtual machine or the second virtual machine to migrate to, wherein:

the selection of the computing devices of the second region is based on the terms of the first service level agreement, and the second region of computing devices has the second service level agreement;

migrate the selected one of the first virtual machine or the second virtual machine to the computing devices of the second region; and update a local table to indicate the migration, wherein the local table is configured to be in communication with the computing devices of the first region, wherein:

the region system server is configured to update a region table to indicate the migration, wherein the region table is configured to be in communication with the region system server, and the global system server is configured to update a global table to indicate the migration, wherein the global table is configured to be in communication with the global system server.

16. The system of claim 15, wherein:

the computing devices of the first region are configured to select the first virtual machine to migrate to the computing devices of the second region, and the computing devices of the first region are further configured to request additional fees to operate the first virtual machine.

17. The system of claim 15, wherein:
the region system server is configured to determine a load of a third region of computing devices, wherein the third region of computing devices has a third service level agreement with the first service class level, and
the computing devices of the first region are configured to migrate one of the first virtual machine or the second virtual machine based on the load of the third region of computing devices.

18. The system of claim 15, wherein:
the local table includes information related to available resources of the first region of computing devices, and information related to the first virtual machine and other virtual machines that currently operate on the computing devices of the first region using operating resources in violation of the terms of the first service level agreement,
the region table includes information related to availability of the first region of computing devices and of the second region of computing devices among the two or more regions of computing devices, and
the global table includes first indications of the first region of computing devices and the two or more regions of computing devices, and second indications of whether the first region of computing devices and/or the two or more regions of computing devices are available to operate the first virtual machine or the second virtual machine.

* * * * *